(12) United States Patent
Compton et al.

(10) Patent No.: US 12,033,003 B2
(45) Date of Patent: Jul. 9, 2024

(54) DYNAMIC WORKLOAD DISTRIBUTION FOR DATA PROCESSING

(71) Applicant: International Business Machines Corporation, Armonk, NY (US)

(72) Inventors: Scott B. Compton, Hyde Park, NY (US); Jeffrey Richard Suarez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 17/443,782

(22) Filed: Jul. 27, 2021

(65) Prior Publication Data

US 2023/0030808 A1    Feb. 2, 2023

(51) Int. Cl.
  *G06F 9/46*      (2006.01)
  *G06F 9/50*      (2006.01)
  *G06F 11/34*    (2006.01)

(52) U.S. Cl.
  CPC .......... *G06F 9/5083* (2013.01); *G06F 9/5066* (2013.01); *G06F 11/3433* (2013.01); *G06F 2209/5017* (2013.01); *G06F 2209/5018* (2013.01); *G06F 2209/508* (2013.01)

(58) Field of Classification Search
  None
  See application file for complete search history.

(56) References Cited

U.S. PATENT DOCUMENTS

| | | | |
|---|---|---|---|
| 6,748,593 B1 * | 6/2004 | Brenner | G06F 9/5083 718/103 |
| 7,237,242 B2 | 6/2007 | Blythe et al. | |
| 2004/0139434 A1 | 7/2004 | Blythe et al. | |

(Continued)

FOREIGN PATENT DOCUMENTS

| | | |
|---|---|---|
| CN | 104142958 A | 11/2014 |
| CN | 111399777 A | 7/2020 |

OTHER PUBLICATIONS

Krikellas et al., "Multithreaded query execution on multicore processors," 35th International Conference on Very Large Data Bases VLDB, Aug. 2009, 13 pages.

(Continued)

*Primary Examiner* — Bing Zhao
(74) *Attorney, Agent, or Firm* — Zilka-Kotab, P.C.

(57) ABSTRACT

A computer-implemented method, according to one embodiment, includes: receiving a data process that includes a plurality of sub-processes. A unique subset of the sub-processes is assigned to each of: a managing thread, and at least one other thread. Moreover, performance characteristics of each of the threads is evaluated while the respective subsets of sub-processes are being performed, and a determination is made as to whether the performance characteristics of each of the threads are substantially equal to the performance characteristics of each of the other threads. In response to determining that performance characteristics of each of the threads are not substantially equal, the subsets of the sub-processes are dynamically adjusted such that the performance characteristics of each of the threads become more equal. Moreover, the adjusted subsets of the sub-processes are reassigned to each of the managing thread and at least one other thread.

20 Claims, 7 Drawing Sheets

(56) References Cited

U.S. PATENT DOCUMENTS

2012/0233486 A1\* 9/2012 Phull .................... G06F 9/5083
    713/375
2012/0284317 A1 11/2012 Dalton
2013/0125133 A1\* 5/2013 Schuster ................ G06F 9/522
    718/105

OTHER PUBLICATIONS

Sohn et al., "Load Balanced Parallel Radix Sort," Proceedings of the 12th International Conference on Supercomputing, 1998, pp. 305-312.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.hist.gov/projects/cloud-computing.

Compton et al., U.S. Appl. No. 17/403,617, filed Aug. 16, 2021.
Compton et al., U.S. Appl. No. 17/403,630, filed Aug. 16, 2021.

\* cited by examiner

DYNAMIC WORKLOAD DISTRIBUTION FOR DATA PROCESSING

BACKGROUND

The present invention relates to data processing, and more specifically, this invention relates to improving performance by dynamically adjusting workload distribution for data processing operations.

Data processes like data sorting generally include processes that involve arranging the data into some meaningful order to make it easier to understand, analyze, visualize, etc. For example, when working with research data, sorting is a common method used for visualizing data in a form that makes it easier to comprehend what the data is representing. While data sorting allows for data to generally be better understood, actually performing the sorting can be a resource intensive process. For instance, operations like data sorting include performing sets of processes in a serial nature, thereby lengthening the time elapsed while attempting to satisfy the processes.

As a result, conventional implementations have experienced a significant consumption of available computing bandwidth when performing such data sorting operations. This is particularly apparent in situations where higher performance storage is utilized to perform at least a portion of the data sorting. While higher performance storage (e.g., such as local cache) provides more desirable performance metrics compared to lower performance storage (e.g., such as external disk), these higher performance metrics are typically paired with lower storage capacity in view of the higher cost associated with the higher performance storage, at least in comparison to the lower performance storage. Accordingly, performance of such conventional systems has significantly been impacted by record processing operations such as data sorting.

SUMMARY

A computer-implemented method, according to one embodiment, includes: receiving a data process at a managing thread, where the data process includes a plurality of sub-processes. A unique subset of the sub-processes is assigned to each of: the managing thread, and at least one other thread. Moreover, each of the subsets of sub-processes are performed by the thread to which the respective subset is assigned, and performance characteristics of each of the threads is evaluated while the respective subsets of sub-processes are being performed. A determination is also made as to whether the performance characteristics of each of the threads are substantially equal to the performance characteristics of each of the other threads. In response to determining that performance characteristics of each of the threads are not substantially equal to the performance characteristics of each of the other threads, the subsets of the sub-processes are dynamically adjusted such that the performance characteristics of each of the threads become more equal. Moreover, the adjusted subsets of the sub-processes are reassigned to each of the managing thread and at least one other thread.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic that is integrated with the processor, executable by the processor, or integrated with and executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for significantly reducing performance times while satisfying data processes. For CPU intensive record processing operations such as key comparisons and data movements, this reduction in achievable performance times is achieved, at least in part, as a result of effectively overlapping I/O processing as much as possible. This increased throughput is achieved by establishing and managing multiple different threads, each of which can be used to satisfy different portions of a data process, e.g., as will be described in further detail below.

In one general embodiment, a computer-implemented method includes: receiving a data process at a managing thread, where the data process includes a plurality of sub-processes. A unique subset of the sub-processes is assigned to each of: the managing thread, and at least one other thread. Moreover, each of the subsets of sub-processes are performed by the thread to which the respective subset is assigned, and performance characteristics of each of the threads is evaluated while the respective subsets of sub-processes are being performed. A determination is also made as to whether the performance characteristics of each of the threads are substantially equal to the performance characteristics of each of the other threads. In response to determining that performance characteristics of each of the threads are not substantially equal to the performance characteristics of each of the other threads, the subsets of the sub-processes are dynamically adjusted such that the performance characteristics of each of the threads become more equal. Moreover, the adjusted subsets of the sub-processes are reassigned to each of the managing thread and at least one other thread.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic that is integrated with the processor, executable by the processor, or integrated with and executable by the processor. Moreover, the logic is configured to: perform the foregoing method.

Figure 1:
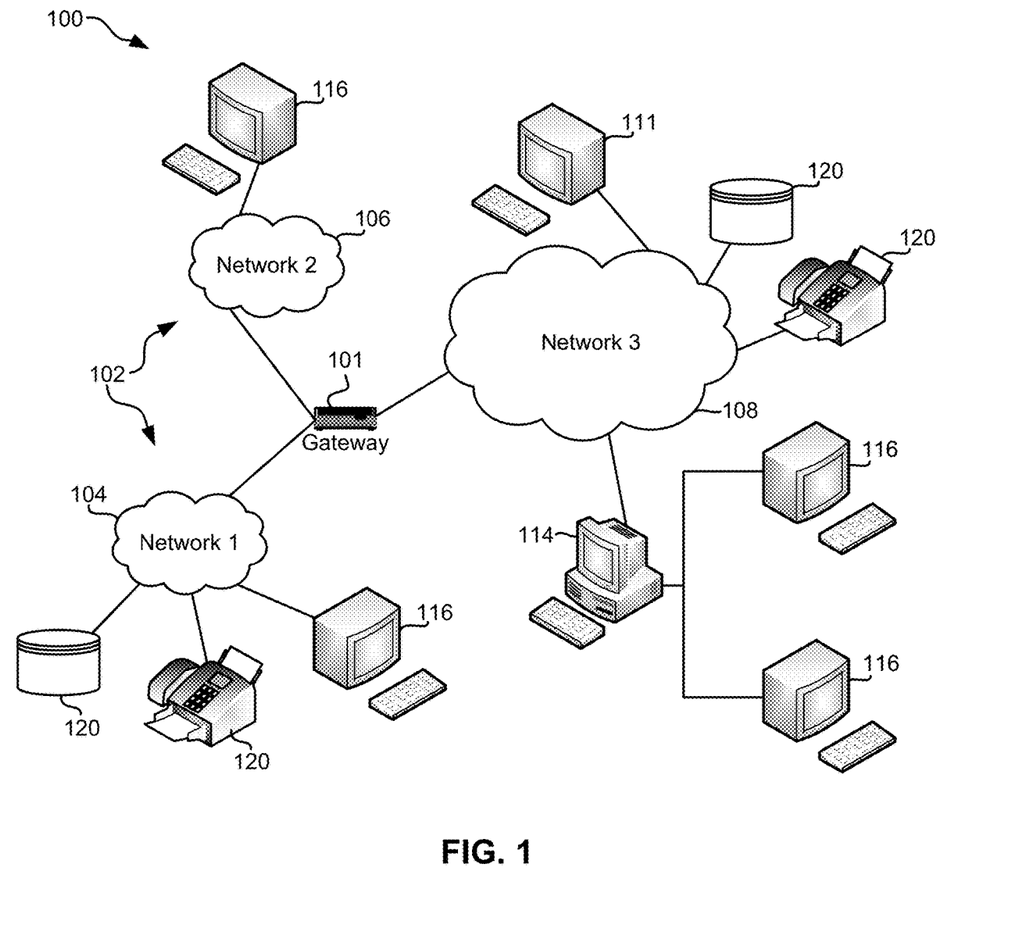
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
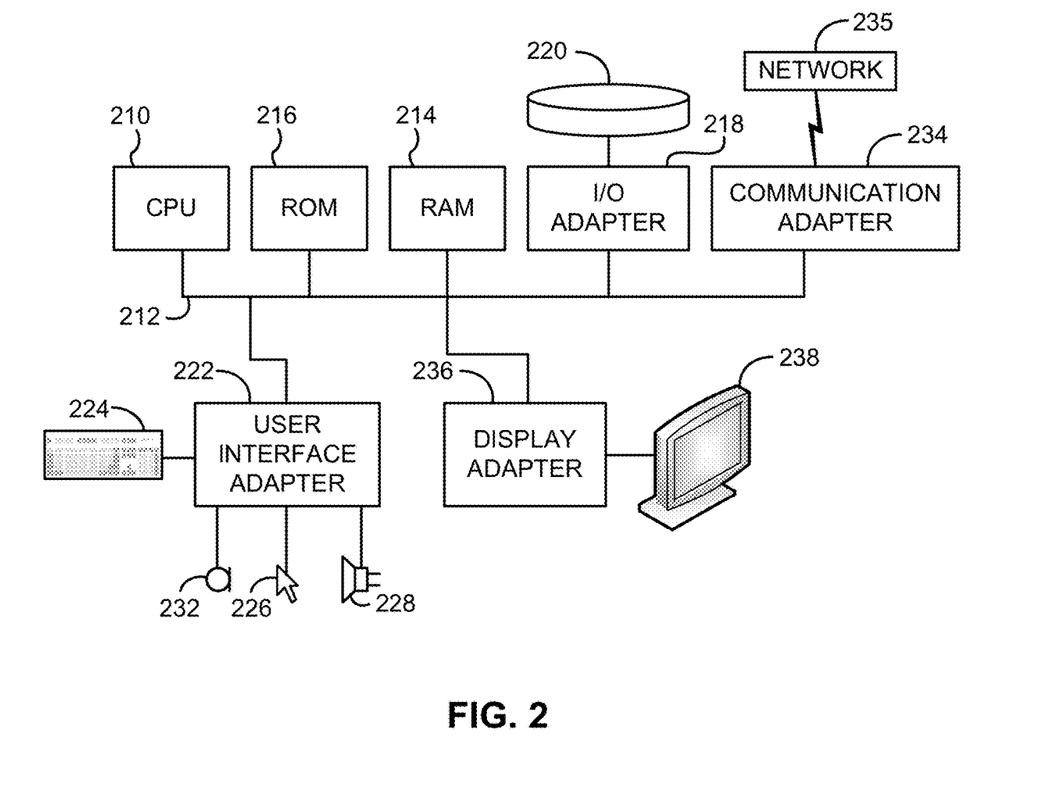
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
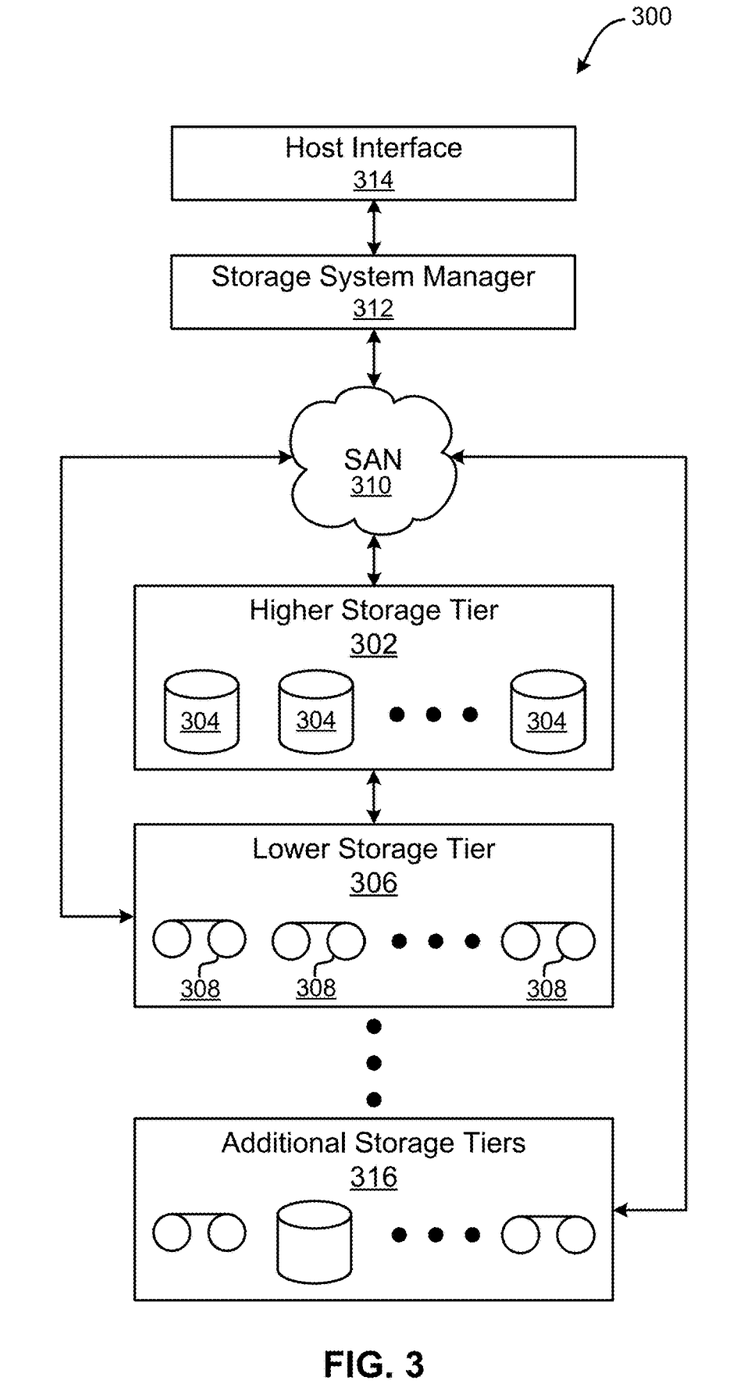
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, conventional systems have experienced a significant consumption of available computing bandwidth and I/O throughput when performing data sorting operations. While data sorting allows for data to generally be better understood, actually performing the sorting can be a resource intensive process. For instance, operations like data sorting include performing sets of processes in a serial nature, thereby lengthening the time elapsed while attempting to satisfy the processes.

This is particularly apparent in situations where higher performance storage is utilized to perform at least a portion of the data sorting. While higher performance storage (e.g., such as local cache) provides more desirable performance metrics compared to lower performance storage (e.g., such as external disk), these higher performance metrics are typically paired with lower storage capacity in view of the higher cost associated with the higher performance storage, at least in comparison to the lower performance storage. Accordingly, performance of such conventional systems has significantly been impacted by record processing operations such as data sorting.

In sharp contrast to these conventional shortcomings, various ones of the approaches included herein are able to significantly reduce performance times while satisfying data processing operations. For operations such as data sorting, this reduction in achievable performance times is achieved, at least in part, as a result of performing different portions of the operations in parallel. This effectively increases throughput of the system and reduces the consumption of computing bandwidth, e.g., as will be described in further detail below.

Figure 4A:
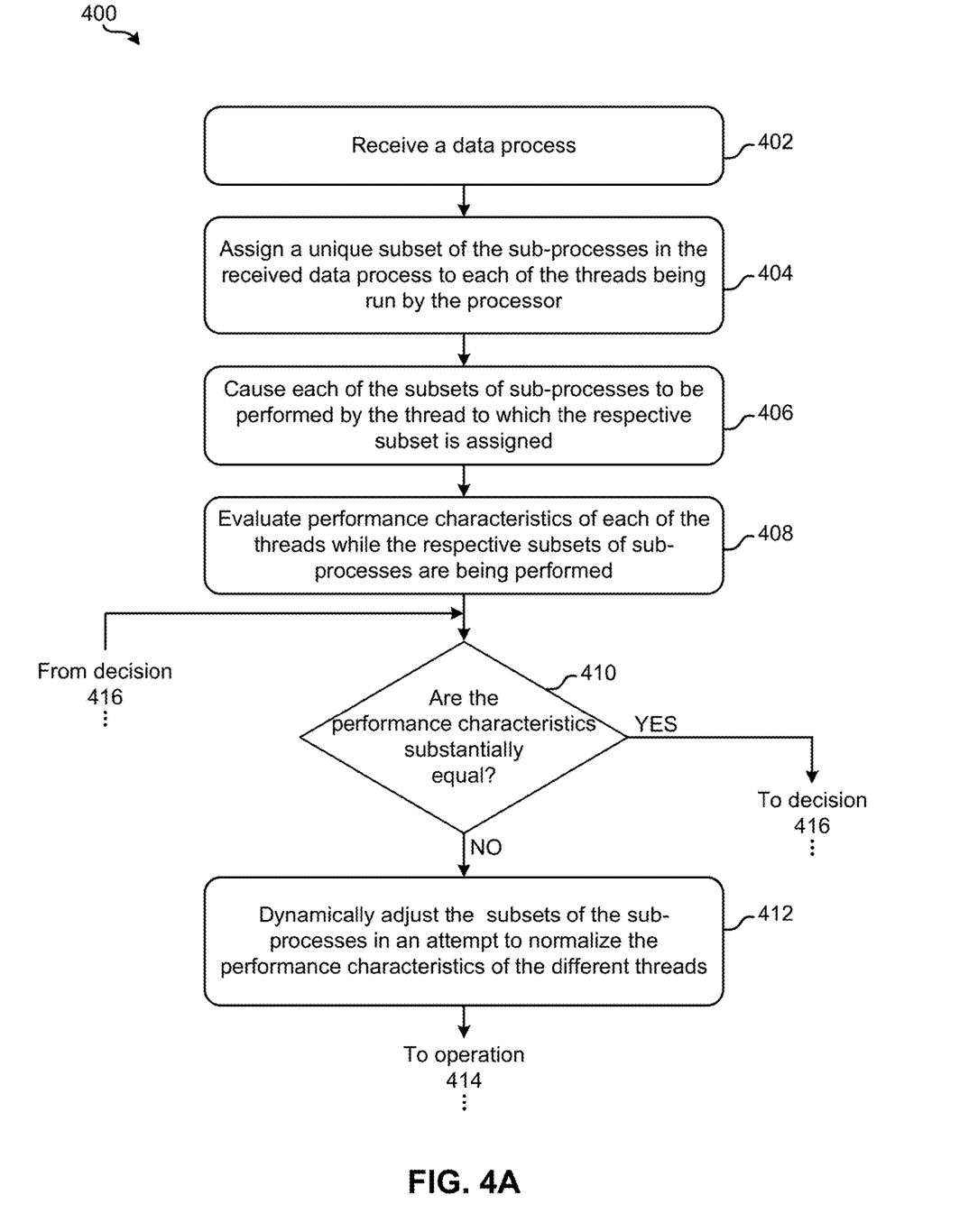
FIG. 4A is a flowchart of a method, in accordance with one embodiment.

Referring now to FIG. 4A, a flowchart of a method 400 for reducing computational resource consumption while performing data processes, is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, one or more of the operations included in method 400 may be performed by a central processor that has access to an input buffer. In other embodiments, the method 400 may be partially or entirely performed by a controller, a processor, a computer, etc., or some other device having one or more processors therein. Thus, in some embodiments, method 400 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes receiving a data process. Depending on the approach, the type of data process received in operation 402 may vary. For instance, in some approaches a data sort process may be received in operation 402, while in other approaches the data process may be a data write process, a deletion process, etc. It should also be noted that the data process may be received in different forms. For example, in some approaches a request to perform a specific data process may be received in operation 402, while in other approaches one or more instructions to perform a data process may be received. The data process itself may also be received from different sources. In different approaches, the data process may be received from a user, a running application, another computing environment, a remote storage location, etc.

While the data process received in operation 402 may vary depending on the given approach as described above, it should be noted that it typically includes a plurality of sub-processes. In other words, although the processes that are received may be of different types, be received from different sources and/or in different forms, etc., each of the processes may still include a number of sub-processes, e.g., as would be appreciated by one skilled in the art after reading the present description. According to an example, which is in no way intended to limit the invention, a data sort process includes I/O sub-processes, sorting sub-processes, and supplemental (e.g., additional) sub-processes which together represent the overall data sort process. Each type of sub-processes may further be assigned to a specific one or more of the threads that exist in a central processor, e.g., as will be described in further detail below.

As noted above, one or more of the operations included in method 400 may be performed by a central processor that has access to an input buffer or queue. Thus, data processes received in operation 402 may be stored in an input buffer or even received from the input buffer itself in some approaches. Entries in the input buffer may be processed in any desired order depending on the approach, e.g., such as first-in-first-out (FIFO), last-in-first-out (LIFO), according to a level of importance, etc.

With respect to the present description, a "process" can be considered an address space or a job which includes multiple different sub-processes therein as previously mentioned. Moreover, a number of threads are used to actually run and perform the work or sub-processes. In other words, a process represents a group of units of work (e.g., sub-processes) which can be satisfied using different threads. It follows that a "thread" essentially performs (e.g., dispatches) units of work on a processor. A thread can also be run using a service request block (SRB) which itself may operate on a processor. Approaches in which threads are run using a SRB may serve as a light-weight option for running the threads, e.g., as would be appreciated by one skilled in the art after reading the present description. Moreover, in such approaches the processor may search SRB queues and/or task queues for threads to run.

The central processor is also preferably able to implement multi-threaded functionality such that more than one of the data sub-processes can be performed by the threads in parallel. With respect to the present description, "multi-threaded" is intended to refer to a situation where multiple sub-processes or multiple units of work can be performed simultaneously and in parallel to accomplish the overarching data process. In other words, the processor used to perform at least some of the operations in method 400 may be able to perform more than one sub-process by running more than one thread at a time, thereby achieving simultaneous multi-threading (SMT). SMT increases efficiency by allowing the processor to increase throughput by increasing the amount of work that is performed in parallel, as well as continuing to work towards satisfying the received data process even when one of the multiple running threads experiences a stall event.

According to an example, which is in no way intended to limit the invention, if a thread is stalled and waiting for a condition to be satisfied (e.g., a step to be performed), it is more efficient for the processor to grab another thread (e.g., another piece of work) and run that thread until it too stalls, whereby the processor can attempt to switch back to a previously stalled thread. Moreover, the processor may be running more than one thread in parallel at a given time, thereby further increasing throughput and efficiency of the system.

As noted above, the processor is desirably able to achieve SMT by running more than one thread at a time. Each thread may also be assigned a different set of sub-processes to be performed as a part of satisfying the originally received data process. Accordingly, referring back to FIG. 4A, method 400 includes assigning a unique subset of the sub-processes in the received data process to each of the threads being run by the processor. See operation 404. Thus, operation 404 includes assigning a unique subset of the sub-processes to each of: a managing thread, and at least one other thread (e.g., a sorting thread) such that each thread then has a different subset assigned thereto, e.g., as will be described in further detail below.

Although the processes that are received may be of different types, be received from different sources and/or in different forms, etc., each of the processes may still include a number of sub-processes, e.g., as would be appreciated by one skilled in the art after reading the present description. According to an example, which is in no way intended to limit the invention, a data sort process includes I/O sub-processes, sorting sub-processes, and supplemental (e.g., additional) sub-processes. Each type of sub-processes may further be assigned to a specific one or more of the threads that exist in a central processor. In other words, while the number of threads actively being run by the processor may vary depending on the situation, certain threads may correspond to predetermined types of sub-processes.

For instance, I/O related sub-processes may be assigned to one of the threads that serves as the managing thread, while sorting related sub-processes are assigned to a sort thread. With respect to the present description, the "managing thread" may represent the unit of work that the system was initially called on, while subsequent threads (e.g., such as a sort thread) are created and become offspring of the original managing thread. In other words, the managing thread is the monitoring and controlling thread that not only performs a subset of the sub-processes associated with a given data process, but also manages the other threads that are being used to perform the remainder of the sub-processes associated with the given data process in parallel with those that have been assigned to the managing thread. Thus, when a subsequent thread is created, the managing thread shifts one or more responsibilities to the subsequent thread, and informs the subsequent thread to pursue the shifted responsibilities.

Referring again to an example, which is in no way intended to limit the invention, a data sort process may initially be received in operation 402 of method 400. A data sort process typically includes I/O related sub-processes, sorting related sub-processes, and various supplemental (e.g., additional) sub-processes. It follows that each of these types of sub-processes may be assigned to a different one of the threads that are running in the processor.

Figure 4B:
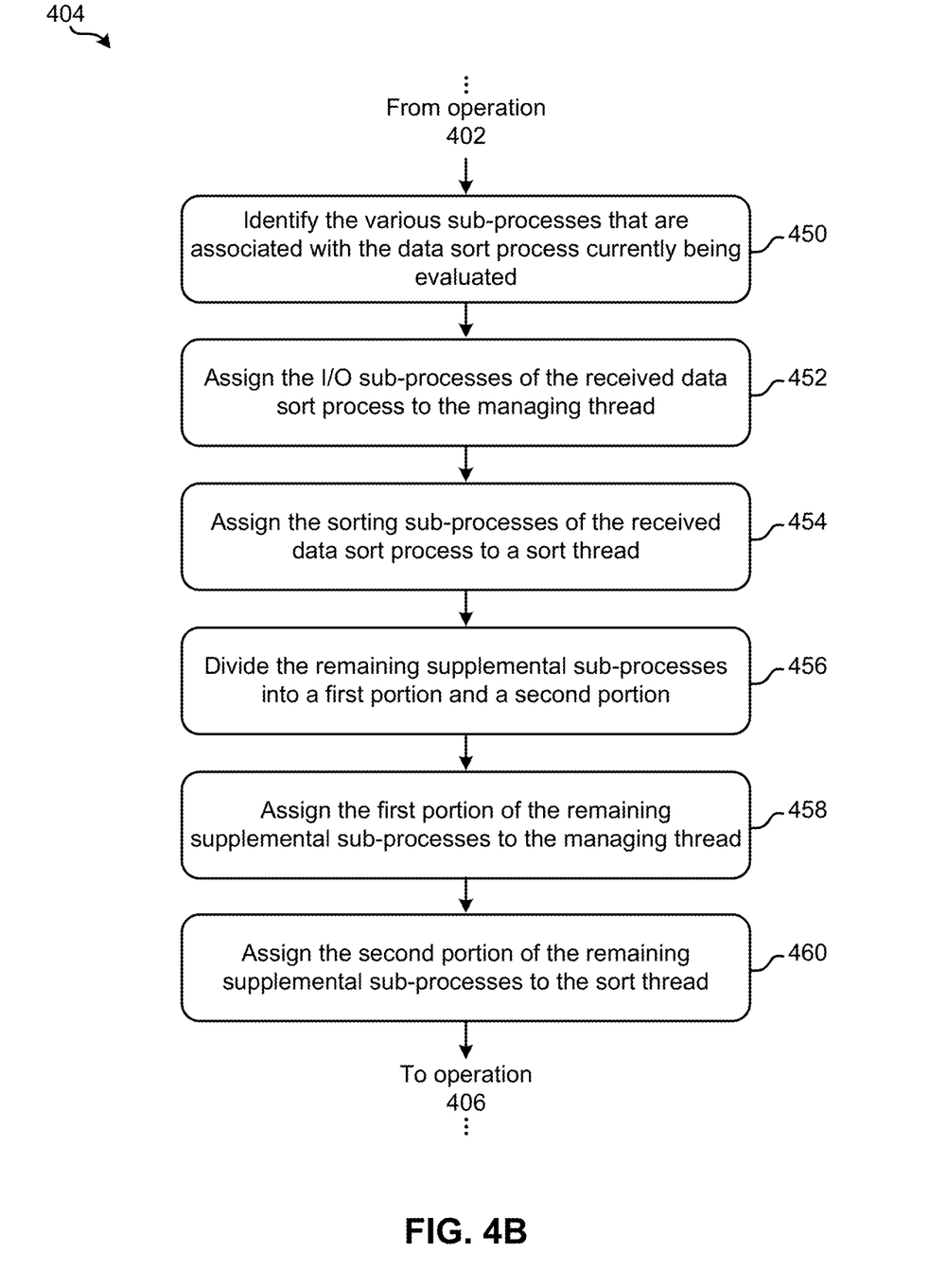
FIG. 4B is a flowchart of sub-processes for one of the operations in the method of FIG. 4A, in accordance with one embodiment.

For instance, referring momentarily now to FIG. 4B, exemplary sub-operations of assigning a unique subset of the sub-processes associated with a data sort process to each of the threads are illustrated in accordance with an in-use embodiment, one or more of which may be used to perform operation 404 of FIG. 4A. However, it should be noted that the sub-operations of FIG. 4B are illustrated in accordance with one in-use embodiment which is in no way intended to limit the invention. For instance, at least some of the sub-operations of FIG. 4B may be implemented in order to satisfy different types of data processes.

As shown, sub-operation 450 includes identifying the various sub-processes that are associated with the data sort process currently being evaluated. This may be achieved by actually inspecting the received data sort process, identifying the sub-processes from a lookup table based on the type of process that was received, adopting a default set of sub-processes associated with the received data sort process, etc. In some approaches, a data sort process includes I/O sub-processes, sorting sub-processes, and supplemental sub-processes.

The identified sub-processes are preferably evaluated and compared to the number and types of threads that currently exist in the processor. This allows for the different types of the sub-processes to be assigned to the corresponding types of threads, as well as ensuring that each thread is assigned about the same amount of work. While certain types of sub-processes are assigned to specific ones of the threads in some approaches, it should also be noted that the number of sub-processes assigned to each of the threads is taken into consideration. As mentioned above, it is preferred that the threads satisfy the sub-processes they are assigned in about the same amount of time, and therefore that the threads experience about the same amount of latency.

While the sub-processes may be assigned to the different threads in a manner that facilitates the sub-processes being completed at about the same time, conditions may change during actual performance of the sub-processes. Accordingly, the multi-threaded sort functionality will also dynamically monitor the progression of the threads and adjust which sub-processes are assigned to which of the threads based on the changing capacities of the threads. Again, the desired outcome is that each of the threads complete the sub-processes assigned thereto with substantially the same amount of blocked (e.g., wait) time experienced.

With continued reference to FIG. 4B, sub-operation 452 includes assigning the I/O sub-processes of the received data sort process to the managing thread, while sub-operation 454 includes assigning the sorting sub-processes of the received data sort process to a sort thread. As noted above, the managing thread may represent the unit of work that the system was initially called on, while subsequent threads (e.g., such as the sort thread) are created and become offspring of the original managing thread. In other words, the managing thread is the monitoring and controlling thread that not only performs a subset of the sub-processes associated with the data sort process in the present in-use embodiment of FIG. 4B, but also manages the other threads that are being used to perform the remainder of the sub-processes associated with the given data sort process in parallel with those that have been assigned to the managing thread. It follows that when a subsequent thread is created, the managing thread shifts one or more responsibilities to the subsequent thread, and informs the subsequent thread to pursue the shifted responsibilities.

While any desired number of threads may be running depending on the particular approach, in the present in-use embodiment, only the managing thread and the sorting thread are currently running. Accordingly, sub-operation 456 includes dividing the remaining supplemental sub-processes into a first portion and a second portion. The first and second portions are ultimately assigned to the managing thread and the sorting thread (e.g., see sub-operations 458, 460 below), so it is desirable that the size of the portions is determined such that the respective threads are able to perform the corresponding sub-processes in about the same amount of time. It follows that performing sub-operation 456 may be based on past performance of the threads, user preferences, predetermined system settings, anticipated throughputs of the system and/or the threads themselves, industry standards, etc.

From sub-operation 456, the flowchart proceeds to sub-operation 458 which includes assigning the first portion of the remaining supplemental sub-processes to the managing thread. Furthermore, sub-operation 460 includes assigning the second portion of the remaining supplemental sub-processes to the sort thread. In some approaches, a sub-process may be assigned to a given thread by adding the sub-process to a queue specifically assigned to the given thread, updating one or more flags, modifying a lookup table, creating a pointer that connects the sub-process to the given thread, etc., or any other steps that would be apparent to one skilled in the art after reading the present description.

Returning now to FIG. 4A, once the various sub-processes have been assigned to one of the threads, method 400 proceeds to operation 406. There, operation 406 includes causing each of the subsets of sub-processes to be performed by the thread to which the respective subset is assigned. In other words, operation 406 includes causing the different subsets of sub-processes to be performed by each of the respective threads.

As noted above, a thread essentially performs (e.g., dispatches) units of work on a processor. It follows that in some approaches, operation 406 may be performed by instructing the various threads to dispatch the units of work associated with the various sub-processes assigned thereto. Moreover, these units of work may be dispatched to a central processor, a SRB acting as a processor, or some other type of computing device capable of performing at least a portion of the sub-processes. It is also preferred that the different subsets of sub-processes are performed by each of the respective threads simultaneously and in parallel. This desirably increases throughput of the system, reduces latency, improves efficiency, and reduces the computational resources consumed in order to satisfy the originally received data process.

While the various sub-processes are being performed by each of the respective threads, performance of the threads is continually monitored. Again, it is desirable that the threads are able to perform the corresponding sub-processes in about the same amount of time. Thus, as the threads continue to work on the sub-processes that are assigned thereto, the managing thread preferably monitors performance characteristics of the threads in order to determine whether adjustments to the assignment of sub-processes should be made. For example, if a particular thread has experienced a high number of delays, the managing thread may determine that some of the sub-processes currently assigned to the delayed thread be reassigned to one or more of the other threads having a lower number of delays.

Accordingly, operation 408 includes evaluating performance characteristics of each of the threads while the respective subsets of sub-processes are being performed, while decision 410 includes determining whether the performance characteristics of each of the threads are substantially equal to the performance characteristics of each of the other threads. In other words, decision 410 includes determining whether the performance characteristics of each of the threads are equal to each other. Different performance characteristics may be used to satisfy operation 408 and decision 410 depending on the particular approach. For instance, in some approaches the wait time experienced by each of the threads may be used as the performance characteristic that determines whether the threads are operating substantially equal. However, in other approaches a number of data failures experienced, the introduction and/or removal of any threads, etc., may be evaluated to determine whether the sub-processes should be reassigned to the threads.

Figure 4C:
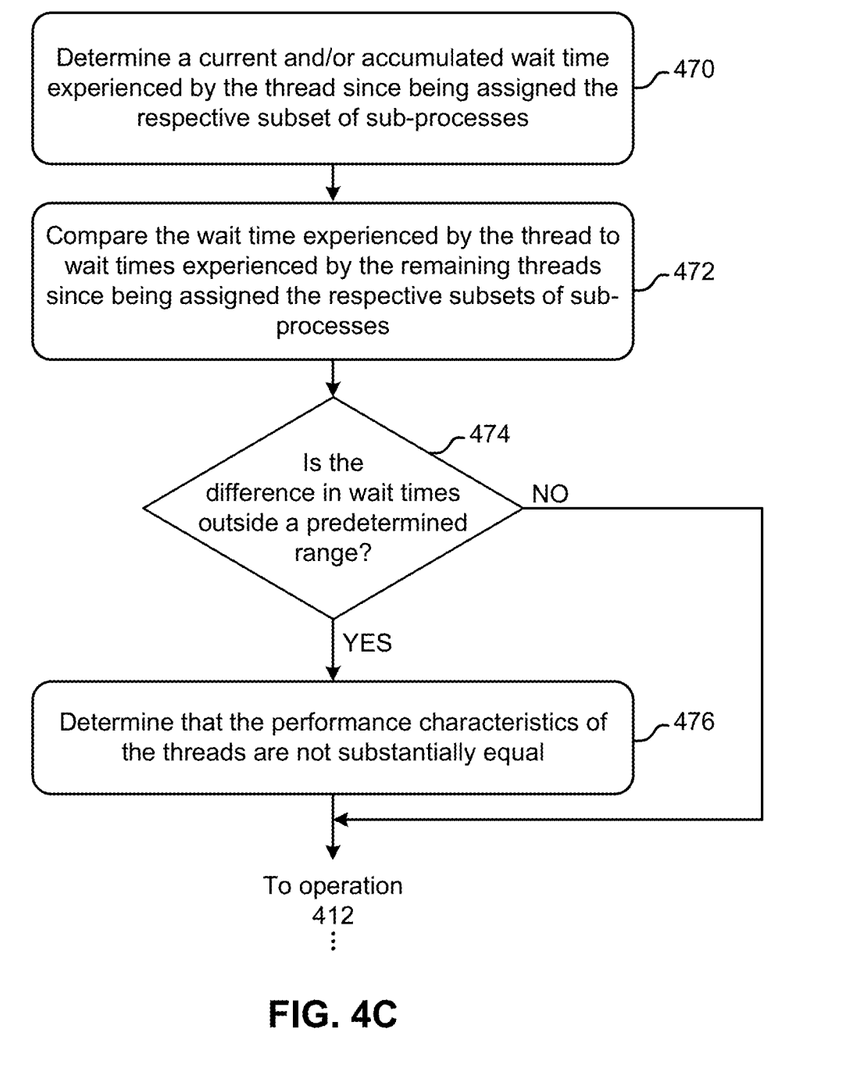
FIG. 4C is a flowchart of sub-processes for one of the operations in the method of FIG. 4A, in accordance with one embodiment.

Referring momentarily now to FIG. 4C, exemplary sub-operations of evaluating performance characteristics of the threads and determining whether the performance characteristics of the threads are substantially equal are illustrated in accordance with an in-use embodiment. One or more of the sub-operations depicted in FIG. 4C may be used to perform operation 408 and/or decision 410 of FIG. 4A. However, it should be noted that the sub-operations of FIG. 4C are illustrated in accordance with one in-use embodiment which is in no way intended to limit the invention. It should also be noted that the sub-operations depicted in FIG. 4C are preferably performed for each of the active threads.

As shown, sub-operation 470 includes determining a current and/or accumulated wait time experienced by the thread since being assigned the respective subset of sub-processes. With respect to the present description, a "wait time" is the amount of time the thread has been inactive or idle while waiting for other sub-processes to be performed by the other threads. Thus, the accumulated wait time of a given thread represents the amount of latency that thread has contributed to the performance of the overarching process. The wait time for a given thread may be initiated (e.g., started) when the thread is actually assigned a subset of sub-processes and may be reset (e.g., ended) when the assigned subset of sub-processes have been completed. However, in other approaches the wait time for a given thread may be accumulated over the life of the thread, be reset in response to receiving an input from a user, be initiated and/or reset in response to a predetermined condition (e.g., experiencing a failure event), etc., or any other desired scheme. This wait time of a thread can also be compared to wait times experienced by the remaining threads since being assigned their respective subsets of sub-processes. See sub-operation 472. This allows for the system to determine whether only the given thread has experienced an unexpected wait time, or if similar levels of latency have been experienced by the remaining threads.

Proceeding to decision 474, a determination is made as to whether a difference between the wait time experienced by the given thread and the wait times experienced by the remaining threads is outside a predetermined range. Decision 474 thereby essentially determines whether the given thread has experienced a disproportional amount of delay in performing the sub-processes that have been assigned thereto. This can be accomplished by comparing the wait time of the given thread to the wait times experienced by each of the other threads individually, comparing it to an average wait time experienced by the other threads, comparing it to the wait times experienced by select ones of the other threads, etc. It should also be noted that "outside a predetermined range" is in no way intended to limit the invention. Rather than determining whether a value is outside a predetermined range, equivalent determinations may be made, e.g., as to whether a value is within a predetermined range, whether a value is above a threshold, whether an absolute value is above a threshold, whether a value is below a threshold, etc., depending on the desired approach.

Moreover, the range may be predetermined by a user, based on industry standards, using anticipated throughputs of the threads, based on past performance, the type of data process being performed, etc.

From decision 474, the flowchart proceeds to operation 476 in response to determining the difference between the wait time experienced by the thread and the wait times experienced by the remaining threads is outside the predetermined range. There, operation 476 includes determining that the performance characteristics of the threads are not substantially equal before proceeding directly to operation 412 of FIG. 4A, e.g., as will be described in further detail below. However, in response to determining that the difference between the wait time experienced by the thread and the wait times experienced by the remaining threads is not outside the predetermined range, the flowchart jumps from decision 474 directly to operation 412 of FIG. 4A.

Returning now to FIG. 4A, method 400 proceeds from decision 410 to operation 412 in response to determining that the performance characteristics of the threads are not substantially equal. There, operation 412 includes dynamically adjusting the different subsets of the sub-processes in an attempt to normalize the performance characteristics of the different threads. In other words, operation 412 includes adjusting the number of sub-processes that are assigned to each of the threads in order to more evenly distribute the amount of wait time that is being experienced by the threads and such that the performance characteristics of each of the threads become more equal. This allows for the system to actively adjust the amount of wait time that is experienced by each of the threads and thereby ensure that the overarching data process is performed more efficiently than if the sub-processes were statically assigned to each of the threads. It should also be noted that method 400 jumps from decision 410 directly to decision 416 in response to determining that the performance characteristics of the threads are substantially equal, e.g., as will be described in further detail below.

Once the number of sub-processes that are assigned to each of the threads has been adjusted, method 400 further includes actually reassigning the adjusted subsets of the sub-processes to each of the managing thread and at least one other thread. See operation 414. The adjusted subsets may be reassigned to the various threads by sending one or more instructions to the respective threads, updating a lookup table (e.g., a logical-to-physical table), adjusting one or more flags, etc.

From operation 414, method 400 proceeds to decision 416 which includes determining whether the data process received in operation 402 has been satisfied. In other words, decision 416 includes determining whether the sub-processes assigned to the various threads have been satisfied. As shown, the flowchart returns to decision 410 in response to determining that the data process received in operation 402 has not yet been satisfied, e.g., such that decision 410 may be repeated in order to determine whether the performance characteristics of the threads are still substantially equal. However, in response to determining that the data process received in operation 402 has been satisfied, the flowchart proceeds from decision 416 to operation 418, whereby method 400 may end. However, it should be noted that although method 400 may end upon reaching operation 418, any one or more of the processes included in method 400 may be repeated in order to satisfy additional data processes. In other words, any one or more of the processes included in method 400 may be repeated for subsequently received data processes.

As noted above, the flowchart also jumps to decision 416 from decision 410 in response to determining that the performance characteristics of the threads are substantially equal. It follows that in response to determining that the performance characteristics of the threads are substantially equal, the assignment of the different subsets of sub-processes to each of the threads is maintained before determining whether the data process itself has been satisfied yet.

It follows that various ones of the operations included in FIGS. 4A-4C are able to gain efficiency by overlapping I/O processing as much as possible, particularly for CPU intensive data processes such as key comparisons and data movements. As described above, this increased throughput is achieved by establishing and managing multiple different threads, each of which can be used to satisfy different portions of a data process. Multiple I/O buffers can be used so processing can run in parallel in addition to dynamically monitoring processing during performance. As a result, the multi-threaded sort functionality described herein is able to dynamically monitor progress and adjust where processing will occur based on which threads have more capacity, with the goal that the threads satisfy all assigned sub-processes with having experienced substantially the same amount of wait time.

According to an in-use example, which is in no way intended to limit the invention, a data sort operation may be received at a processor having a managing thread and a sort thread. The I/O related sub-processes in the data sort operation may thereby be performed by the managing thread, while data sorting related sub-processes may be assigned to the sort thread specifically. It follows that for the input phase of the sort processing, the managing (e.g., I/O) thread may obtain the input data (e.g., either from external media or from some programmatic process), and provide full buffers to the sort thread which could then sort the data. For instance, data may be gathered from different sources depending on the approach. These sources may include memory (e.g., disk, magnetic tape, etc.), a socket over a network, an application, etc. The managing thread may also minimize blocking itself from I/Os by utilizing multiple buffers.

The sort thread also performs key comparisons to determine whether the system is performing efficiently. These comparisons can be interrupted in certain situations though, such as when in an input phase and there is no current input buffer to process or when in an output phase and all output buffers are full. The comparisons may also be interrupted in situations where memory has become or was constrained, and the I/O task was involved with processing spill data to and/or from disk.

With continued reference to the present in-use example, it follows that the main division of labor is that I/Os are being performed by the managing thread, while sorting is performed by the sort thread. Additional sub-processes that are associated with performing the overarching data process can occur in either thread. Some of these sub-processes that can be performed by either thread include, but are in no way limited to data summation, report processing, spill processing, record editing (e.g., when data is being transformed, expanded, truncated, etc. to meet user preferences), record restoration (e.g., rebuilding data that had to be spilled to disk in memory constrained situations), etc.

For instance, in some approaches any available thread may be used to perform key extraction. Sorting keys are typically normalized as they can be in many different formats, e.g., such as ascending vs. descending, zoned decimal format, packed decimal format, multi-byte character set consideration, etc. In some situations, key extraction involves separating the non-key data from the key data. However, in other approaches any available thread may be used to perform sequence detection processing in which an already ascending or descending sequence detection can help determine where the next input record should be placed.

It follows that the managing thread (e.g., the I/O thread may be considered the managing thread) will determine the responsibility of each thread at the start of processing, and the assignment of these responsibilities is made available to each thread. Each thread will keep track of the amount of time it has spent waiting on the remaining thread(s) as the managing thread can detect significant deviations in wait times experienced by the threads and reassign the responsibilities thereof dynamically. For instance, assuming that a managing thread and a sort thread are used for a given sort process, the managing thread may build channel programs to read data, fill the buffers, and then provide the filled buffers to the sort thread. The sort thread may thereby perform the sorting process (e.g., key extraction, actual sorting, etc.) and once all input data has been read, the sort thread may begin to queue data to the managing thread for final output processing.

The managing thread may restore the records into their original form (e.g., by unnormalizing the key data into the original record format), place the data into the output buffers, build the channel programs, and write the data to the output dataset. However, if the managing thread determines that the sort thread is waiting more than the managing thread is, the responsibility of restoring the records into their original form and placing those records into the output buffer could be moved to the sort thread, thereby providing better balance in processing and increasing the achievable throughput of the system.

Each thread is also preferably able to keep track of how much effort is spent performing each of these responsibilities. For instance, an ideal performance of key extraction can be evaluated (e.g., timed) to gain a better understanding of how much processing power and/or time should be spent performing the various sub-processes. This monitoring will help the monitoring thread determine which responsibilities could be shifted to create the most balanced workload and thereby maximize efficiency.

Again, various ones of the approaches included herein are desirably able to survey what computing resources are available and assign the various sub-processes to be completed to the available threads. If the sub-processes are being performed as desired, the approaches herein may not perform any reassignments of the work. However, the different threads preferably perform the sub-processes in about the same amount of time, and therefore the managing thread may balance the different units of work (sub-processes) associated with the received process and distribute them to an available thread. Moreover, dynamic adjustments may be made to the work assignments, e.g., based on actual performance of the system, until the originally received process is satisfied.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a data process at a managing thread, wherein the data process includes a plurality of sub-processes;
   assigning, by the managing thread, a unique subset of the sub-processes to each of: the managing thread, and at least one other thread;
   causing, by the managing thread, each of the subsets of sub-processes to be performed by the thread to which the respective subset is assigned;
   evaluating, by the managing thread, performance characteristics of each of the threads while the respective subsets of sub-processes are being performed;
   determining, by the managing thread, whether the performance characteristics of each of the threads are substantially equal to the performance characteristics of each of the other threads;
   in response to determining that performance characteristics of each of the threads are not substantially equal to the performance characteristics of each of the other threads, dynamically adjusting, by the managing thread, a number of the sub-processes that are included in each of the subsets of the sub-processes such that the performance characteristics of each of the threads become more equal;
   reassigning, by the managing thread, the adjusted subsets of the sub-processes to each of the managing thread and the at least one other thread; and
   causing, by the managing thread, each of the adjusted subsets of the sub-processes to be performed by the thread to which the respective adjusted subset is assigned.

2. The computer-implemented method of claim 1, wherein causing each of the subsets of sub-processes to be performed by the thread to which the respective subset is assigned includes causing the subsets of sub-processes to be performed by each of the respective threads simultaneously and in parallel.

3. The computer-implemented method of claim 1, wherein evaluating performance characteristics of each of the threads includes, for each of the threads:
   determining a wait time experienced by the thread since being assigned the respective subset of sub-processes; and
   comparing the wait time experienced by the thread to wait times experienced by the remaining threads since being assigned the respective subsets of sub-processes.

4. The computer-implemented method of claim 3, wherein determining whether the performance characteristics of each of the threads are substantially equal to the performance characteristics of each of the other threads includes:
   determining whether a difference between the wait time experienced by the thread and the wait times experienced by the remaining threads is outside a predetermined range; and
   in response to determining the difference between the wait time experienced by the thread and the wait times experienced by the remaining threads is outside the predetermined range, determining that the performance characteristics of the threads is not substantially equal.

5. The computer-implemented method of claim 1, comprising:
   in response to determining that performance characteristics of each of the threads are substantially equal to the performance characteristics of each of the other threads, maintaining the assignment of the subsets of sub-processes to the threads to which assigned.

6. The computer-implemented method of claim 1, wherein the data process is a sort process having: input/output (I/O) sub-processes, sorting sub-processes, and supplemental sub-processes.

7. The computer-implemented method of claim 6, wherein assigning a unique subset of the sub-processes to each of: the managing thread and at least one other thread includes:
   assigning the I/O sub-processes to the managing thread;
   assigning the sorting sub-processes to a sort thread;
   dividing the supplemental sub-processes into a first portion and a second portion;
   assigning the first portion of the supplemental sub-processes to the managing thread; and
   assigning the second portion of the supplemental sub-processes to the sort thread.

8. A computer program product comprising a computer readable storage medium having program instructions embodied therewith, the program instructions readable and/or executable by a processor cause the processor to:
   receive, by the processor via a managing thread executing on the processor, a data process that includes a plurality of sub-processes;
   assign, by the processor via the managing thread, a unique subset of the sub-processes to each of: the managing thread, and at least one other thread;
   cause, by the processor via the managing thread, each of the subsets of sub-processes to be performed by the thread to which the respective subset is assigned;
   evaluate, by the processor via the managing thread, performance characteristics of each of the threads while the respective subsets of sub-processes are being performed;
   determine, by the processor via the managing thread, whether the performance characteristics of each of the threads are substantially equal to the performance characteristics of each of the other threads;

in response to determining that performance characteristics of each of the threads are not substantially equal to the performance characteristics of each of the other threads, dynamically adjust, by the processor via the managing thread, a number of the sub-processes that are included in each of the subsets of the sub-processes such that the performance characteristics of each of the threads become more equal;

reassign, by the processor via the managing thread, the adjusted subsets of the sub-processes to each of the managing thread and at least one other thread; and cause, by the processor via the managing thread, each of the adjusted subsets of the sub-processes to be performed by the thread to which the respective adjusted subset is assigned.

9. The computer program product of claim 8, wherein causing each of the subsets of sub-processes to be performed by the thread to which the respective subset is assigned includes causing the subsets of sub-processes to be performed by each of the respective threads simultaneously and in parallel.

10. The computer program product of claim 8, wherein evaluating performance characteristics of each of the threads includes, for each of the threads:
determining a wait time experienced by the thread since being assigned the respective subset of sub-processes; and
comparing the wait time experienced by the thread to wait times experienced by the remaining threads since being assigned the respective subsets of sub-processes.

11. The computer program product of claim 10, wherein determining whether the performance characteristics of each of the threads are substantially equal to the performance characteristics of each of the other threads includes:
determining whether a difference between the wait time experienced by the thread and the wait times experienced by the remaining threads is outside a predetermined range; and
in response to determining the difference between the wait time experienced by the thread and the wait times experienced by the remaining threads is outside the predetermined range, determining that the performance characteristics of the threads is not substantially equal.

12. The computer program product of claim 8, wherein the program instructions are readable and/or executable by the processor to cause the processor to:
in response to determining that performance characteristics of each of the threads are substantially equal to the performance characteristics of each of the other threads, maintain, by the processor, the assignment of the subsets of sub-processes to the threads to which assigned.

13. The computer program product of claim 8, wherein the data process is a sort process having: input/output (I/O) sub-processes, sorting sub-processes, and supplemental sub-processes.

14. The computer program product of claim 13, wherein assigning a unique subset of the sub-processes to each of: the managing thread and at least one other thread includes:
assigning the I/O sub-processes to the managing thread;
assigning the sorting sub-processes to a sort thread;
dividing the supplemental sub-processes into a first portion and a second portion;
assigning the first portion of the supplemental sub-processes to the managing thread; and
assigning the second portion of the supplemental sub-processes to the sort thread.

15. A system, comprising:
a processor executing a managing thread; and
logic integrated with the processor, executable by the processor, or integrated with and executable by the processor, the logic being configured to:
receive, by the processor via the managing thread, a data process that includes a plurality of sub-processes;
assign, by the processor via the managing thread, a unique subset of the sub-processes to each of: the managing thread, and at least one other thread;
cause, by the processor via the managing thread, each of the subsets of sub-processes to be performed by the thread to which the respective subset is assigned;
evaluate, by the processor via the managing thread, performance characteristics of each of the threads while the respective subsets of sub-processes are being performed;
determine, by the processor via the managing thread, whether the performance characteristics of each of the threads are substantially equal to the performance characteristics of each of the other threads;
in response to determining that performance characteristics of each of the threads are not substantially equal to the performance characteristics of each of the other threads, dynamically adjust, by the processor via the managing thread, a number of the sub-processes that are included in each of the subsets of the sub-processes such that the performance characteristics of each of the threads become more equal;
reassign, by the processor via the managing thread, the adjusted subsets of the sub-processes to each of the managing thread and at least one other thread; and
cause, by the processor via the managing thread, each of the adjusted subsets of the sub-processes to be performed by the thread to which the respective adjusted subset is assigned.

16. The system of claim 15, wherein causing each of the subsets of sub-processes to be performed by the thread to which the respective subset is assigned includes causing the subsets of sub-processes to be performed by each of the respective threads simultaneously and in parallel.

17. The system of claim 15, wherein evaluating performance characteristics of each of the threads includes, for each of the threads:
determining a wait time experienced by the thread since being assigned the respective subset of sub-processes; and
comparing the wait time experienced by the thread to wait times experienced by the remaining threads since being assigned the respective subsets of sub-processes.

18. The system of claim 17, wherein determining whether the performance characteristics of each of the threads are substantially equal to the performance characteristics of each of the other threads includes:
determining whether a difference between the wait time experienced by the thread and the wait times experienced by the remaining threads is outside a predetermined range; and
in response to determining the difference between the wait time experienced by the thread and the wait times experienced by the remaining threads is outside the predetermined range, determining that the performance characteristics of the threads is not substantially equal.

19. The system of claim 15, wherein the logic is configured to:
in response to determining that performance characteristics of each of the threads are substantially equal to the performance characteristics of each of the other threads, maintain, by the processor, the assignment of the subsets of sub-processes to the threads to which assigned.

20. The system of claim 15, wherein the data process is a sort process having:
- input/output (I/O) sub-processes, sorting sub-processes, and supplemental sub-processes, wherein assigning a unique subset of the sub-processes to each of: the managing thread and at least one other thread includes:
- assigning the I/O sub-processes to the managing thread;
- assigning the sorting sub-processes to a sort thread;
- dividing the supplemental sub-processes into a first portion and a second portion;
- assigning the first portion of the supplemental sub-processes to the managing thread; and
- assigning the second portion of the supplemental sub-processes to the sort thread.

\* \* \* \* \*